(12) United States Patent
Togawa

(10) Patent No.: US 8,247,927 B2
(45) Date of Patent: Aug. 21, 2012

(54) DEVICE AND NETWORK SYSTEM

(75) Inventor: Satoshi Togawa, Ibaraki (JP)

(73) Assignee: Omron Corporation, Kyoto-shi (JP)

( * ) Notice: Subject to any disclaimer, the term of this patent is extended or adjusted under 35 U.S.C. 154(b) by 368 days.

(21) Appl. No.: 12/710,953

(22) Filed: Feb. 23, 2010

(65) Prior Publication Data

US 2010/0231054 A1 Sep. 16, 2010

(30) Foreign Application Priority Data

Mar. 11, 2009 (JP) ................................ 2009-058007

(51) Int. Cl.
*B23K 11/24* (2006.01)
(52) U.S. Cl. ........................................................ 307/112
(58) Field of Classification Search .................. 307/112
See application file for complete search history.

(56) References Cited

U.S. PATENT DOCUMENTS

| | | |
|---|---|---|
| 2005/0201306 A1* | 9/2005 | Engel ............................ 370/299 |
| 2006/0273661 A1 | 12/2006 | Toebes et al. |
| 2007/0081553 A1 | 4/2007 | Cicchetti et al. |
| 2009/0031152 A1 | 1/2009 | Bolderl-Ermel et al. |

FOREIGN PATENT DOCUMENTS

| | | |
|---|---|---|
| DE | 10 2006 036 770 A1 | 2/2008 |
| JP | 2005-269890 A | 9/2005 |
| WO | WO 2008/023382 A1 | 2/2008 |

OTHER PUBLICATIONS

European Patent office extended European search report on Application No. 10153837.9 dated May 6, 2010; 3 pages.

* cited by examiner

*Primary Examiner* — Robert L. Deberadinis
(74) *Attorney, Agent, or Firm* — Foley & Lardner LLP

(57) ABSTRACT

In a device according to one aspect of the invention, plural communication ports switch appropriately between a power receiving port and a power feeding port, thereby dealing with supply of electric power through a network in various network configurations. Plural devices are connected to a network cable to form a network system. In an initial state before power receiving, all plural communication ports of the device are put in to a power receiving enabling state. When the electric power is supplied from one of the communication ports, other communication ports are put into a power receiving disabling state. The device feeds part of the received electric power to another adjacent device by utilizing the communication port put into the power receiving disabling state. The supply of electric power can sequentially be performed from the device that receives the supply of electric power from an external power feeding installation to an adjacent device, and finally all the devices receive the supply of electric power through the network.

8 Claims, 7 Drawing Sheets

■ SIGNAL RECEIVING ENABLING (IN POWER FEEDING) STATE  ☐ SIGNAL RECEIVING DISABLING STATE

▒ ⟶ IN POWER FEEDING     ▒ ---▸ POWER FEEDING ENABLING STATE

POWER ON      POWER OFF

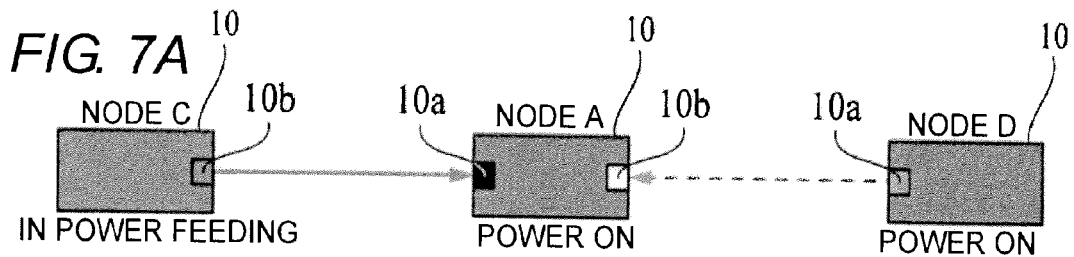
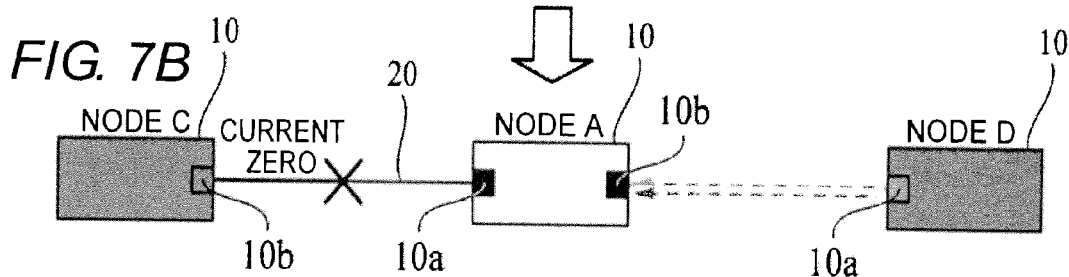
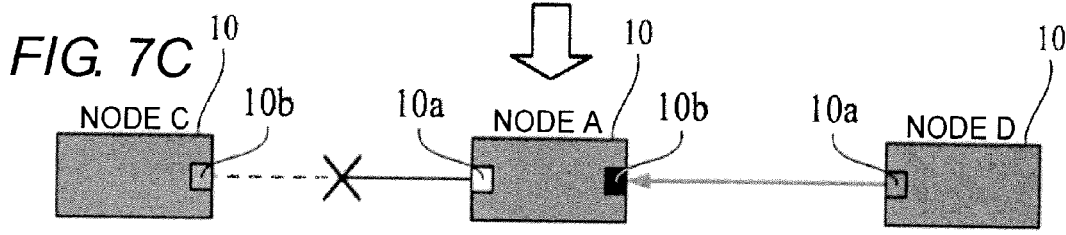
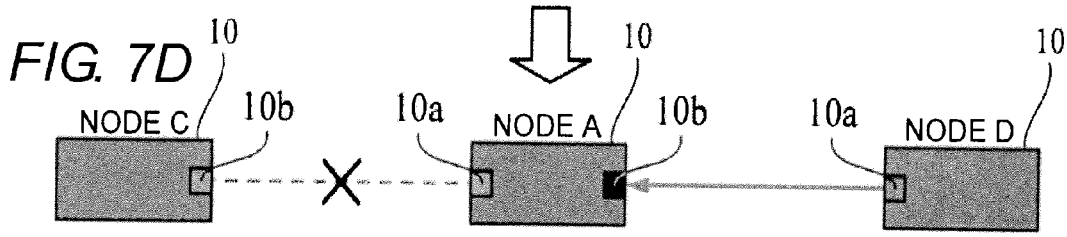
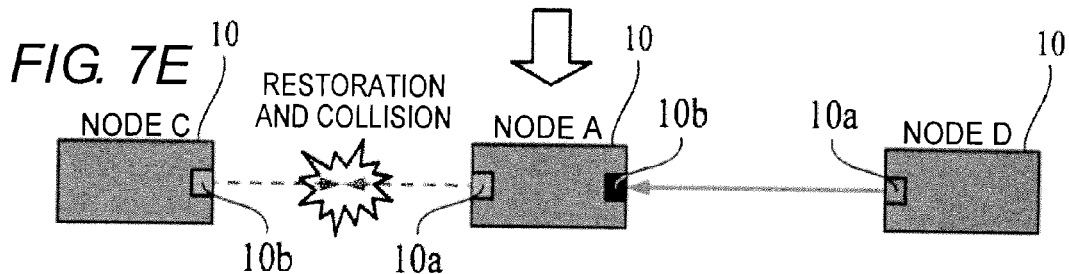
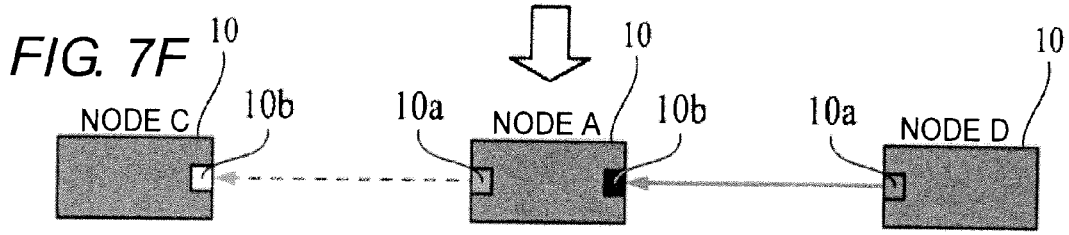

DEVICE AND NETWORK SYSTEM

BACKGROUND OF THE INVENTION

This application is based on Japanese Patent Application No. 2009-058007 filed with the Japan Patent Office on Mar. 11, 2009, the entire content of which is hereby incorporated by reference.

1. Technical Field

The present invention relates to a device constituting a network and a network system, more particularly to an improved technology concerting supply of electric power to the device through the network.

2. Related Art

PoE (Power over Ethernet (registered trademark)) is a technology for supplying the electric power by utilizing an Ethernet (registered trademark) cable. The use of PoE can facilitate the supply of electric power to the device installed in the site the electric power is hardly directly supplied. In PoE, because both the data and the electric power can be transmitted through the cable, it is not necessary to separately wire the cable for data communication and the cable for supply of electric power, and the wiring is easy to provide when devices constituting the network system are installed in the field.

In the network system such as PoE having the power feeding function, there has been proposed a technology for supplying part of the electric power that is received through the network by the device connected to the network to another device through the network (for example, see Japanese Unexamined Patent Publication No. 2005-269890).

However, for the device having the function of supplying part of the electric power received through the network to another device, a communication port used for power receiving and a communication port are used while previously determined. Unfortunately configuration of the communication port becomes troublesome because the function of each communication port is previously determined. Further, the supply of electric power cannot be received by utilizing the power feeding communication port, even if the communication port configured for the power feeding is vacant in case of trouble with the power receiving communication port or the network cable connected to the power receiving communication port. As disclosed in Japanese Unexamined Patent Publication No. 2005-269890, a connection mode of the devices is limited to the network configuration in which the electric power is supplied from an upstream side to a downstream side like a serial configuration, a hub and spoke configuration, and a combination thereof. Therefore, the technology disclosed in Japanese Unexamined Patent Publication No. 2005-269890 is hardly applied to a network system such as a ring network configuration in which the electric power is probably received from any one of plural communication ports.

SUMMARY

In accordance with a first aspect of the present invention, a device that is connected to a network includes: plural power ports; and a control unit that puts the plural power ports into a power receiving enabling state in an initial state before power receiving, the control unit switching the power ports that receive no supply of electric power to a power receiving disabling state when receiving the supply of the electric power from one of the plural power ports.

The device includes the plural power port that can receive the electric power in the initial state, so that the power of the device can be turned on even if the electric power is received from any one of the power ports. Because the other power port is switched to the power receiving disabling state once the power of the device is turned on, the supply of electric power is not performed from the plural power ports. It is not necessary to previously determine the power port for the power receiving. Therefore, the electric power supply pathway can flexibly and automatically be determined depending on the situation of the network.

In accordance with a second aspect of the invention, preferably the device according to the first aspect of the invention further includes: an electric power supply unit that uses part of the supplied electric power as the electric power supplied to another device connected to the network; and a unit that outputs the electric power, outputted from the electric power supply unit, from one of the power ports that are switched to the power receiving disabling state toward another device. Accordingly, the device that receives the supply of electric power through the network can perform the power feeding to another device. The power feeding is performed to another device by utilizing the electric power port that becomes the power receiving disabling state in which the supply of electric power is not received. Therefore, it is not necessary that the power feeding port and the power feeding port be previously allocated to the plural power port, and the flexible correspondence can be made depending on the situation of the network. Particularly, for the ring network configuration, the power port that receives the electric power is indeterminate in the plural power ports, and the device to which the own electric power should be supplied varies according to the power port that actually receives the electric power. However, the device according to the first aspect of the invention can correspond with the situation because the power receiving port and the power feeding port are appropriately switched.

In accordance with a third aspect of the invention, preferably the device according to the second aspect of the invention further includes: a unit that detects electric power necessary for another device; and a unit that determines whether power feeding can be performed to another device based on an electric power necessary for the own device and the supplied electric power, the unit directly outputting the electric power outputted from the electric power supply unit toward another device when the power feeding can be performed to another device, the unit making a request for an increase in power feeding amount to an installation and a device that supplies the electric power to the device when power feeding cannot be performed to another device. Accordingly, even if the power feeding is not performed to another device due to the lack of electric power, the power feeding can be performed by increasing the amount of own power feeding.

In accordance with a fourth aspect of the invention, in the device according to the first to third aspects of the invention, preferably the power port is a communication port that conducts data communication, and the network can transmit the data and the electric power. For example, this can be realized by PoE.

In accordance with a fifth aspect of the invention, preferably the device according to the first to third aspects of the invention further includes a unit that switches all the plural power ports to the power receiving enabling state when the power feeding is eliminated. Accordingly, even if the power feeding is interrupted to turn off the power of the device, the power of the device can be turned on by receiving the supply of electric power from another device. Therefore, for example, in the ring network, even if the power feeding is interrupted because of the generation of the trouble such as the disconnection of the cable through which the supply of electric power is received, another electric power supply pathway can be formed to continue the operation.

In accordance with a sixth aspect of the invention, a network system in which plural devices are connected through a network, wherein at least one of the plural devices includes a unit that receives supply of electric power from an external power supply while supplying part of the supplied electric power to another device connected to the network, and another device is the device according to the first to fifth aspects of the invention. In such cases, assuming that another device is one that described in the second or third aspect of the invention, suitably the device constituting the network can sequentially supply the electric power to another device.

In accordance with a seventh aspect of the invention, a network system in which plural devices are connected into a ring shape, wherein at least one of the plural devices includes a unit that receives supply of electric power from an external power supply while supplying part of the supplied electric power to another device connected to the network, and another device is the device according to the second or third aspect of the invention. The plural devices may receive the supply of electric power from the external power supply. Particularly, when the plural devices receive the supply of electric power from the external power supply, even if the own device that receives the supply of electric power from the external power supply or the external power supply goes down, suitably the electric power supply pathway to the device constituting the network system from a certain device that receives the supply of electric power from another external power supply is secured. In the ring network system, as described later, when attention is paid to another device, the port from which the supply of electric power is received is indeterminate in the plural ports. Therefore, in the device according to the first aspect of the invention, another device receives the electric power from any port. Once the electric power is received from one of the ports, the electric power is prohibited to be received from the other port. In the device according to the second or third aspect of the invention, the power feeding is performed to another device from the other port from which the electric power is not received. Therefore, the supply of electric power can be prevented from being received from both the devices while the electric power is sequentially supplied to the plural devices. Further, more suitably another device is formed by the device according to the fourth or fifth aspect of the invention based on the device according to the second or third aspect of the invention.

In the invention, any one of the plural power ports can act as the power receiving port that receives the supply of electric power. Additionally the invention can properly correspond with various network configurations, because the supply of electric power is not received from another power port once the power port becomes the power receiving port.

BRIEF DESCRIPTION OF THE DRAWINGS

FIGS. 7A to 7F illustrate the power feeding pathway switching function of the device.

DETAILED DESCRIPTION

Figure 1A:
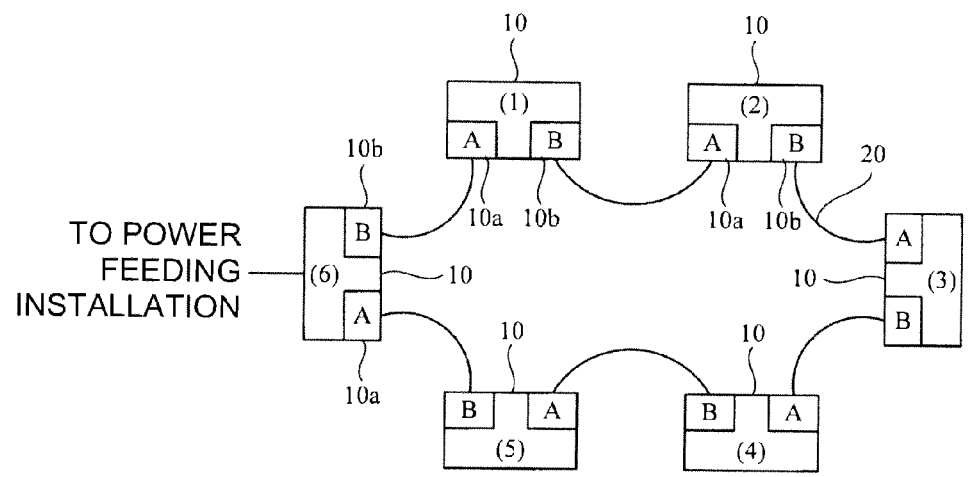
FIGS. 1A and 1B illustrate an example of a network system.

FIG. 1 illustrates an example of a network system. In a configuration of the network system, devices 10 each of which has plural communication ports (in the embodiment, a first communication port 10a and a second communication port 10b) are wired into a ring shape through a network cable 20. That is, the communication ports of adjacent devices 10 are connected through the network cable 20. The device 10 is pursuant to Ether CAT (registered trademark: Ethernet for Control Automation Technology) that is one of industrial network standards. The Ether CAT (registered trademark) is a high-speed field bus system based on the Ethernet (registered trademark).

Figure 1B:
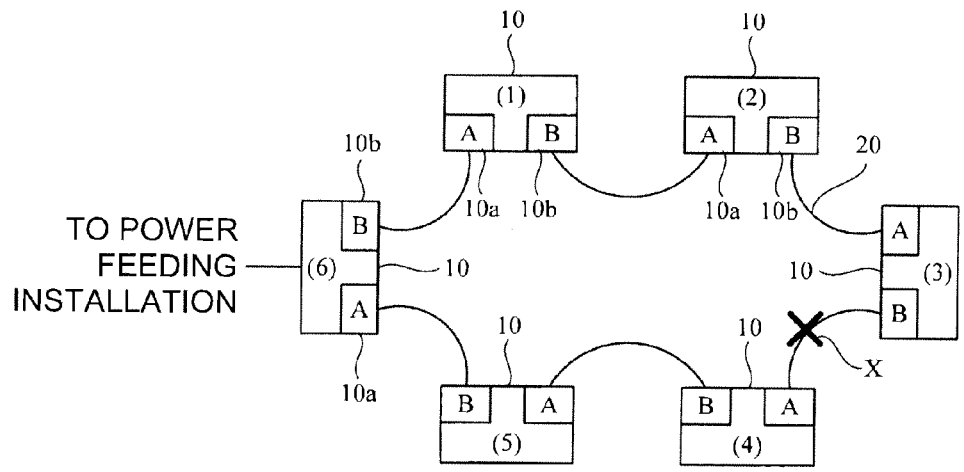

In the ring connection mode, for example, even if the network cable 20 is disconnected at one point (point X in FIG. 1B) as illustrated in FIG. 1B, the data communication can be continued through another pathway. Accordingly, the device 10 has a function of monitoring where the network cable 20 is disconnected and a function of instantaneously switching the data communication pathway in disconnection.

The Ether CAT (registered trademark) is based on the Ethernet (registered trademark), and the Ether CAT uses the Ether CAT-based network cable 20 to performs the function of PoE, that is, the transmission of both the data and the electric power. In the embodiment, the electric power is supplied through the network cable 20 by utilizing the function of PoE. That is, at least one of the plural devices 10 constituting the network system is connected to an external power feeding installation and plural devices 10 receive the electric power from the power feeding installation. In FIG. 1, the device 10 at a node (6) receives the supply of electric power from the power feeding installation. The devices 10 at nodes (1) to (5) receive the supply of electric power through the network cable 20.

For example, the device 10 at the node (6) feeds the electric power to the device 10 at the node (1) from the second communication port 10b through the network cable 20, the device 10 at the node (1) can feed part of the received electric power from the second communication port 10b to the device 10 at the node (2) through the network cable 20. At this point, in the device 10 at the node (1), the first communication port 10a acts as a power receiving port and the second communication port 10b acts as a power feeding port. When each device feeds part of the received electric power to an adjacent device, a situation in which one of the devices receives the supply of electric power from adjacent devices on both sides is generated because of the ring network configuration. Occasionally there is also generated a situation in which adjacent devices 10 connected through the network cable 20 feed the electric power to each other. The device 10 of the embodiment has a function of controlling the situations when the situations are generated. Each of the devices 10 can be operated even after the disconnection by switching the power feeding pathways according to the disconnection of the network cable 20. Therefore, high-reliability network can be realized with wiring saving.

Figure 2:
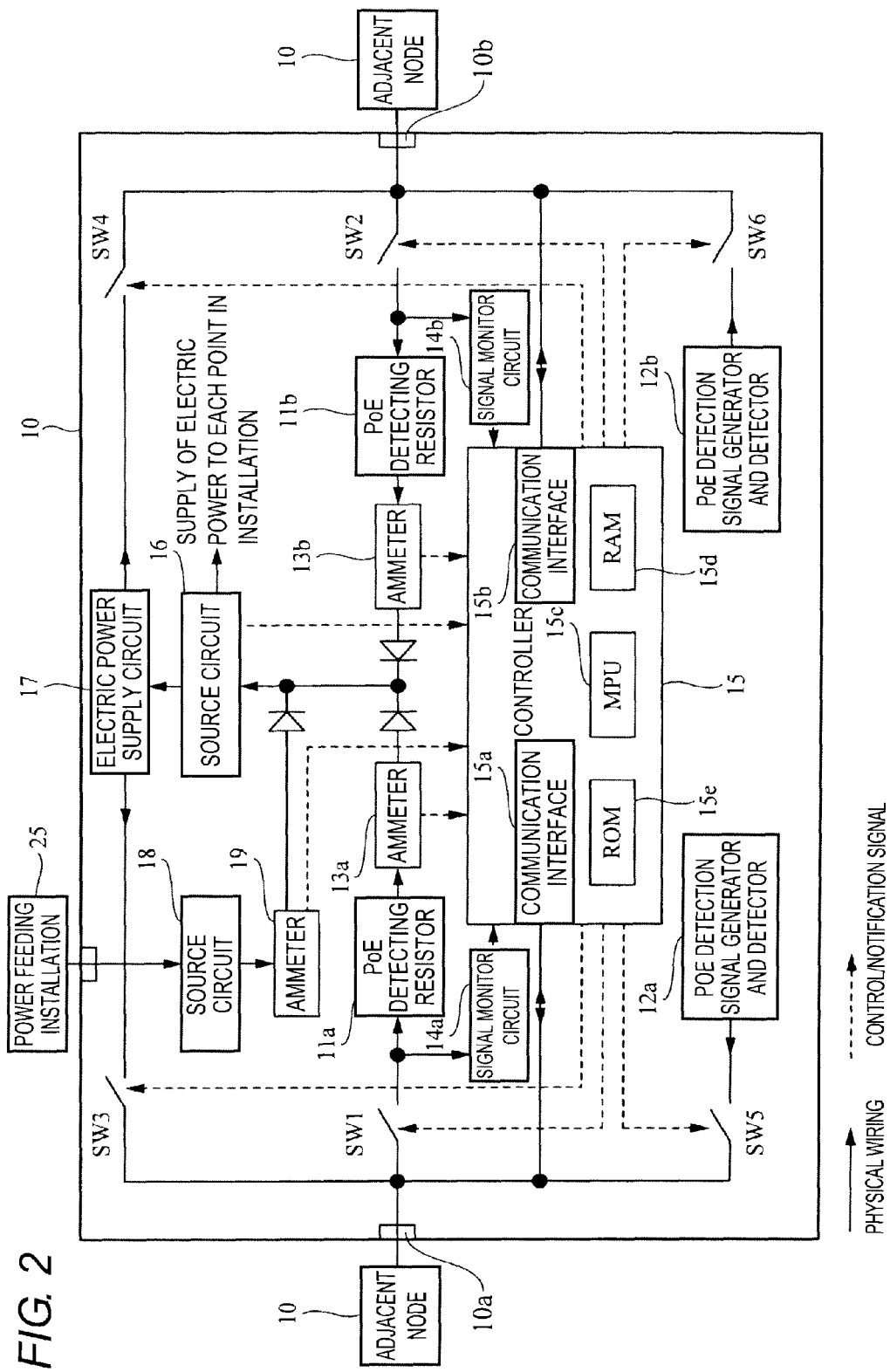
FIG. 2 illustrates an internal configuration of a device according to an embodiment of the invention.

FIG. 2 illustrates an internal configuration of the device 10 that realizes the function. A PoE detecting resistor 11a is connected to the first communication port 10a through a PoE detecting resistor valid-invalid changeover switch SW1. Similarly, a PoE detecting resistor 11b is connected to the second communication port 11b through a PoE detecting resistor valid-invalid changeover switch SW2. Each of the PoE detecting resistors 11a and 11b exhibits whether the connected communication port is in the power receiving enabling state to the device at the adjacent node. The power receiving enabling state is exhibited when the PoE detecting resistor valid-invalid changeover switch SW1 is closed to connect the PoE detecting resistor 11a to the first communication port 10a. That is, the adjacent device connected to the first communication port 10a determines that the communication port is in the power receiving enabling state when recognizing that the PoE detecting resistor 11a is connected. Accordingly, the adjacent device starts the power feeding, and the device 10 receives the electric power through the first communication port 10a to be able to perform power on. On the other hand, the power receiving disabling state is exhibited when the PoE detecting resistor valid-invalid changeover switch SW1 is opened to disconnect the PoE detecting resistor 11a from the first communication port 10a. That is, the adjacent device connected to the first communication port 10a determines that the communication port is in the power receiving disabling state when recognizing that the PoE detecting resistor 11a is not connected. Therefore, the adjacent device does not start the power feeding.

Each of the PoE detecting resistors 11a and 11b has a function of exhibiting the least electric power with which the device 10 can be started up by itself in terms of a resistance value thereof. That is, the adjacent device can recognize power consumption of the device 10 from the resistance value while recognizing that each of the PoE detecting resistors 11a and 11b is connected. Specifically, there are four classes in the PoE standard. For example, the device started up as "class 1: 0.44 to 3.84 W" can receive the electric power when the adjacent device is started up as "class 2: 3.84 to 6.49 W".

class 0: 0.44 to 12.95 [W]
class 1: 0.44 to 3.84 [W]
class 2: 3.84 to 6.49 [W]
class 3: 6.49 to 12.95 [W]

The same holds true for the PoE detecting resistor 11b and PoE detecting resistor valid-invalid changeover switch SW2, which are connected onto the side of the second communication port 11b. The PoE detecting resistor valid-invalid changeover switches SW1 and SW2 are switched based on a control signal from a controller 15. In an initial state in which the device 10 is turned off, the PoE detecting resistor valid-invalid changeover switches SW1 and SW2 are closed, and the communication ports 10a and 10b are in the power receiving enabling state. When the controller 15 confirms the power receiving from one of the communication ports, the PoE detecting resistor valid-invalid changeover switch connected to the other communication port is opened, and the other communication port is put into the power receiving disabling state. When the communication port is put into the power receiving disabling state, the other party performs control so as not to feed the electric power, thereby suppressing the situation in which the electric power is received from both the communication ports.

When the PoE detecting resistor valid-invalid changeover switches SW1 and SW2 are opened, the electric power is not supplied to an internal source circuit 16 even if the electric power is provided from the device adjacent to the connected communication port. Therefore, the control is performed after the start-up such that one of the PoE detecting resistor valid-invalid changeover switches SW1 and SW2 is closed while the other is opened, which allows the supply of electric power to be received from only one of the two signal ports. That is, the situation in which the electric power is received from both the signal ports can be suppressed.

A PoE detection signal generator and detector 12a is connected to the first communication port 10a through the PoE power receiving enabling-disabling check performing switch SW5. Similarly, a PoE detection signal generator and detector 12b is connected to the second communication port 11b through a PoE power receiving enabling-disabling check performing switch SW6. Each of the PoE detection signal generators and detectors 12a and 12b checks the PoE detecting resistor of the adjacent device connected through the network cable 20. Each of the PoE detection signal generators and detectors 12a and 12b detects the presence or absence (power receiving enabling state/power receiving disabling state) of the connection of the PoE detecting resistor, and each of the PoE detection signal generators and detectors 12a and 12b detects the resistance value of the PoE detecting resistor when the PoE detecting resistor is connected. When the PoE power receiving enabling-disabling check performing switches SW5 and SW6 are turned on, the circuits 12a and 12b are operated to perform the check. The power receiving enabling-disabling check performing switches SW5 and SW6 are switched based on a control signal from the controller 15. Because the check is performed when the electric power is fed to the adjacent device, it is necessary that at least the own signal port be in the power receiving disabling state. Therefore, the controller 15 performs on-off control such that both the switches are not turned on in a set of "the PoE detecting resistor valid-invalid changeover switch SW1 and the power receiving enabling-disabling check performing switch SW5" and a set of "the PoE detecting resistor valid-invalid changeover switch SW2 and the power receiving enabling-disabling check performing switch SW6" (occasionally both the switches are turned off).

Ammeters 13a and 13b are connected to terminals opposite the communication ports 10a and 10b in the PoE detecting resistors 11a and 11b, respectively. The ammeters 13a and 13b measure current values of the electric powers received from the communication ports 10a and 10b, respectively. The measurement results of the ammeters 13a and 13b are provided to the controller 15.

Signal monitor circuits 14a and 14b are connected to terminals at which the PoE detecting resistors 11a and 11b are connected to the communication ports 10a and 10b, respectively. The signal monitor circuits 14a and 14b monitor whether the PoE detection signals are continuously supplied from the communication ports 10a and 10b, respectively. The signal monitor circuits 14a and 14b provide the detection results to the controller 15.

The controller 15 includes a communication interface 15a that is connected to the first communication port 10a, a communication interface 15b that is connected to the second communication port 10b, MPU 15c that performs various kinds of processing in order to control the whole of the device based on the provided pieces of information, RAM 15d that is used as a work memory during the operation of MPU 15c, and ROM 15e in which a program and a parameter are stored in order to perform the pieces of processing. The communication interfaces 15a and 15b are pursuant to the Ethernet (registered trademark), and the communication interfaces 15a and 15 transmit and receive the data to and from other devices 10 connected to the network through the communication ports 10a and 10b.

The sides on which the ammeters 13a and 13b are not connected to the PoE detecting resistors 11a and 11b are connected to the source circuit 16 through back-flow prevention diodes. The source circuit 16 feeds the electric power to each point in the device, and part of the electric power is provided to an electric power supply circuit 17.

The electric power supply circuit 17 outputs PoE electric power in order to feed the electric power to the device at another node. The PoE electric power is provided to the communication ports 10a and 10b through power feeding control switches SW3 and SW4, respectively. When the controller 15 closes the power feeding control switch SW3, the PoE electric power outputted from the electric power supply circuit 17 can be transmitted to the communication port of the adjacent device that is connected to the network cable 20 through the power feeding control switch SW3 and the first communication port 10a. That is, the first communication port 10a becomes the power feeding port. Similarly, when the controller 15 closes the power feeding control switch SW4, the PoE electric power is outputted to the second communication port 10b. That is, the second communication port 10b becomes the power feeding port.

For example, when the first communication port 10a becomes the power receiving port to receive the supply of electric power from adjacent device, the controller 15 opens (turns off) the PoE detecting resistor valid-invalid changeover switch SW2 and the power feeding control switch SW3 while closing (turning on) the PoE detecting resistor valid-invalid changeover switch SW1 and the power feeding control switch SW4. Therefore, the electric power fed through the first communication port 10a is led to the source circuit 16, and the electric power is supplied to each point of the device 10. At the same time, part of the fed electric power is transmitted to the electric power supply circuit 17, and part of the electric power can be fed to another device through the second communication port 10b.

For the device at the node (1) having the function of receiving the supply of electric power from an external power feeding installation 25 such as commercial power source (AC100V), a source circuit 18, an ammeter 19, and a flow-back prevention diode are connected in series between the source circuit 16 and a power feeding port 10c from the power feeding installation 25. The source circuit 18 converts the electric power supplied from the power feeding installation 25 into a voltage equivalent to that of PoE. The ammeter 19 measures a current of the electric power outputted from the source circuit 18. The ammeter 19 provides the detection result to the controller 15. The device that is not connected to the external power feeding installation 25 may have a configuration in which the device does not include the power feeding port 10c, the source circuit 18, and the ammeter 19 and the like. Obviously the device 10 including these functions may receive the supply of electric power by PoE from one of the communication ports while being not connected to the power feeding installation 25.

The controller 15 controls the states (switching between the power receiving enabling state and the power receiving disabling state, and switching between power feeding and power receiving) of the communication ports 10a and 10b according to the state of the adjacent device connected through the network cable 20. The function of the controller 15 will be described below by providing specific examples of the operations. In the following drawings, because description is made based on the device at the central node A, only one communication port connected to the node A is illustrated in the communication ports of each of the right and left devices (power feeding node and node B). However, as illustrated in FIG. 1, obviously each of the right and left devices includes the second communication port (not illustrated) in order to adopt the ring network configuration.

FIG. 3 illustrates a procedure in start-up. In FIG. 3, the node connected to the power feeding installation 25 that is of the external power supply is referred to as power feeding node. The device at the node (1) of FIG. 1 corresponds to the power feeding node of FIG. 3. The device 10 of FIG. 2 that receives the supply of electric power from the power feeding installation 25 while including the power feeding port 10c, the source circuit 18, and the ammeter 19 corresponds to the power feeding node of FIG. 3. The power of the device 10 constituting the power feeding node is turned on by receiving the supply of electric power from the external power feeding installation. In the embodiment, the other devices 10 (node A and B) are turned off because the devices 10 (node A and B) receive no supply of electric power. The PoE detecting resistors 11a and 11b are set so as to be turned on, and the communication ports 10a and 10b are set so as to become the power receiving enabling state. A normally-closed contact switches are used as the PoE detecting resistor valid-invalid changeover switches SW1 and SW2. Therefore, the communication ports 10a and 10b can be set to the power receiving enabling state even if the power is turned off.

Figure 3A:
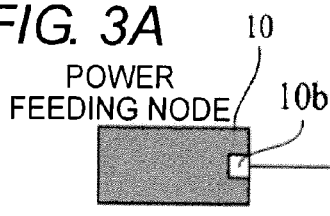
FIGS. 3A to 3E illustrate a power feeding pathway switching function of the device.
Figure 3A:
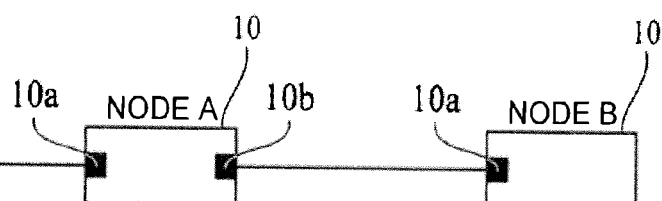
Figure 3B:
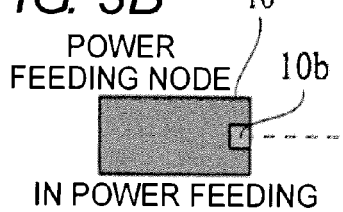
Figure 3B:
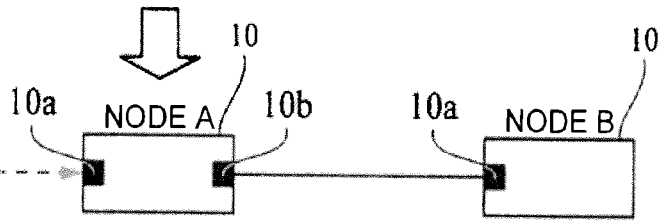

As illustrated in FIG. 3B, the controller 15 of the device 10 at the power feeding node puts the second communication port 10b into the power feeding enabling state to check the PoE detecting resistor connected to the first communication port 10a of the device 10 at the adjacent node A. That is, the controller 15 of the device 10 at the power feeding node performs the control so as to close the PoE power receiving enabling-disabling check performing switch SW6, and the PoE detection signal generator and detector 12b checks on-off of the PoE detecting resistor of the device 10 at the node A, and the PoE detection signal generator and detector 12b checks the resistance value of the PoE detecting resistor when the PoE detecting resistor is turned on.

Figure 3C:
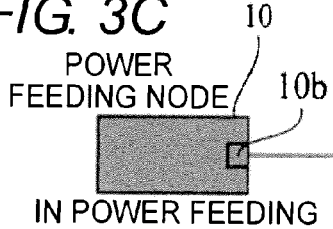
Figure 3C:
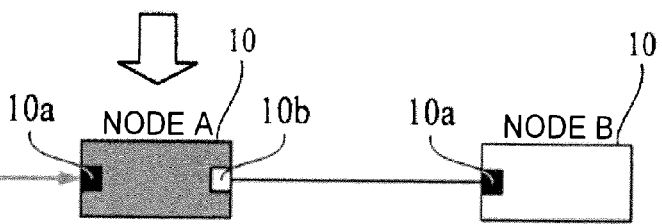

As illustrated in FIG. 3C, when the first communication port 10a of the device 10 at the adjacent node A can receive the electric power, the device 10 at the power feeding node starts the power feeding by PoE. When the device 10 at the node A receives the supply of electric power from the first communication port 10a, the source circuit 16 supplies the electric power to each point in the device (power on), the PoE detecting resistor valid-invalid changeover switch SW2 on the side of the second communication port 10b is opened to put the second communication port 10b into the power receiving disabling state (PoE detecting resistor 11b is turned off: invalid). At this point, because the electric power is not supplied from the device 10 at the node A to the device 10 at the node B, the power of the device 10 at the node B remains turned off.

Figure 3D:
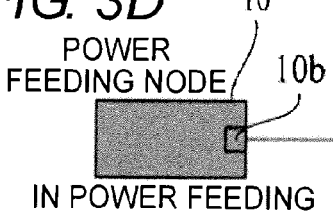
Figure 3D:
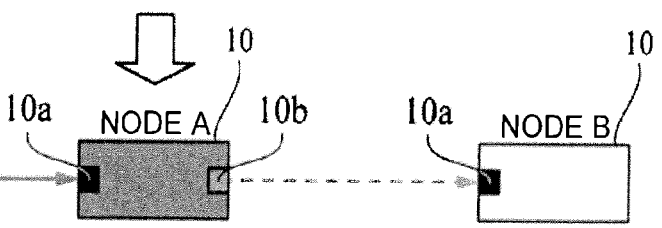

As illustrated in FIG. 3D, as with the device at the power feeding node of FIG. 3B, the controller at the node A puts the second communication port 10b into the power feeding enabling state to check the PoE detecting resistor connected to the first communication port 10a of the device 10 at the adjacent node B. In FIG. 3D, the first communication port 10a at the node B is in the power receiving enabling state, the controller 15 at the node A recognizes that the first communication port 10a at the node B is in the power receiving enabling state. The controller 15 at the node A determines the necessary electric power from the resistance value of the PoE detecting resistor at the node B. Specifically, the controller 15 determines which class the other party belongs to. When the class of the other party is lower than the own class, the controller 15 at the node A determines whether the power feeding can be performed to the node B by the electric power in which the own consumption of the electric power is subtracted from the received electric power (can be computed from the current value measured by the ammeter 13).

Figure 3E:
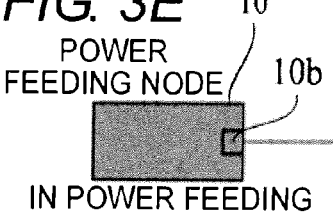
Figure 3E:
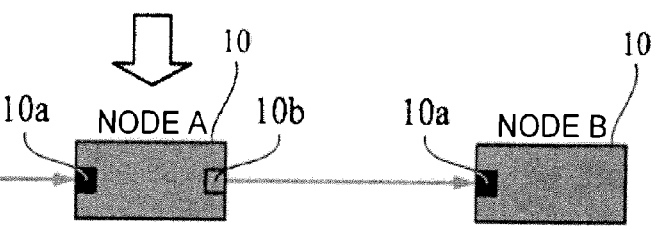
Figure 3E:
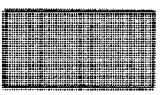
Figure 3E:

When the power feeding can be performed, the controller 15 at the node A closes the power feeding control switch SW4 to output the PoE electric power, outputted from the electric power supply circuit 17, from the second communication port 10b. As illustrated in FIG. 3E, the power feeding is started from the second communication port of the device at the node A to the device at the node B, and the device at the node B receives the power feeding from the device at the node A to turn on the power. Therefore, the device at the node A receives the power feeding by PoE from the device at the power feeding node, and part of the fed electric power can supply the electric power to another device (node B). Then, the electric power can be supplied to all the devices constituting the network by PoE by repeating the processing.

Figure 4A:
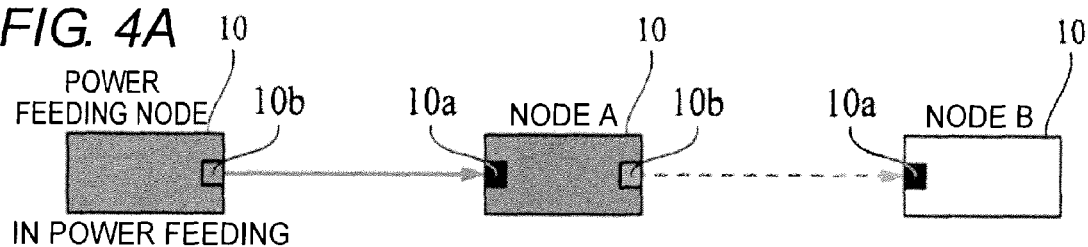
FIGS. 4A to 4C illustrate the power feeding pathway switching function of the device.
Figure 4B:
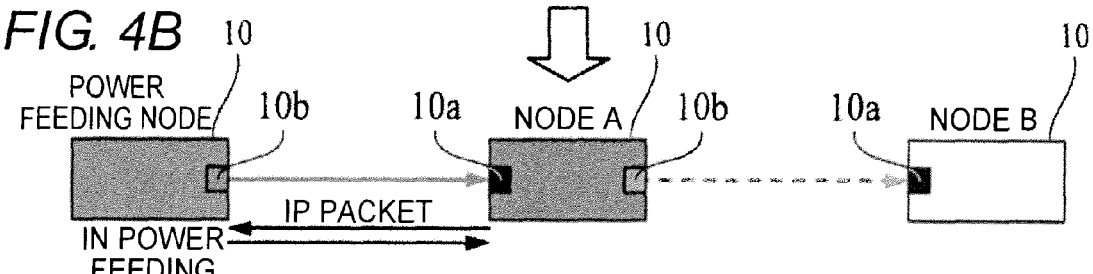

FIG. 4 illustrates a control procedure in shortage of electric power. In FIG. 4A, as with the procedure of FIG. 3D, the device at the node A checks the PoE detecting resistor of the device at the node B to determine whether the electric power can be supplied. When the supply of electric power requested by the other party cannot be performed, as illustrated in FIG. 4B, the controller 15 at the node A negotiates with the device at the power feeding node, which performs the power feeding to the device at the node A using the IP packet, for enhancing the electric power supplied to the device at the node A.

Figure 4C:
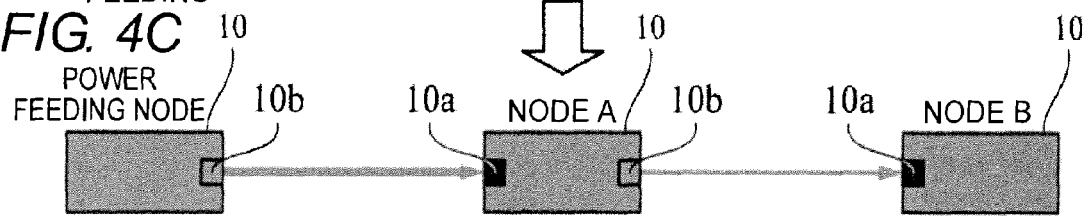

As illustrated in FIG. 4C, when the device at the power feeding node receiving the request for increasing the supply of electric power can increase the electric power, the device at the node A raises the power receiving class thereof to start the supply of electric power to the device at the node B, whereby the power of the device at the node B is turned on. There is a risk of lacking the supply of electric power. Therefore, when the electric power is received from one of the communication ports, the power feeding control switch connected to the other communication port is not immediately closed to supply the electric power, but the electric power is supplied after a confirmation that the electric power can be supplied. Accordingly, that the lack of the electric power supplied to each point in the device at the node A is generated by the power feeding to put the device at the node A into the disabled state can be prevented. In order to comply with the request for increasing the supply of electric power during the lack of the electric power, preferably the electric power is classified finer than the classification of PoE.

FIG. 5 illustrates a processing procedure when PoE detecting resistor checking signals collide with each other. Particularly, for the ring network configuration, when each device sequentially performs the processing for feeding part of the electric power received from one of the communication ports from the other communication port, as illustrated in FIG. 5A, occasionally the adjacent devices output the PoE detecting resistor checking signals to each other.

In such cases, the controller of each device performs the control such that one of the nodes automatically stops the detection signal. The controller 15 recognizes that the own PoE detection signal generators and detectors 12a and 12b output the detection signals to detect the PoE detecting resistors of the adjacent device, and the collision is generated not to detect the check result when the detection signals are simultaneously outputted to the same network cable 20. Therefore, when the state is continued, the controller 15 recognizes that the detection signals are outputted from both the devices. At this point, each controller 15 stops the output of the detection signal at appropriate timing by a random number. Because of the use of the random number, the devices differ from each other in the time the output of the detection signal is stopped. In the embodiment, it is assumed that the device at the node A stops the supply of the detection signal first.

Figure 5A:
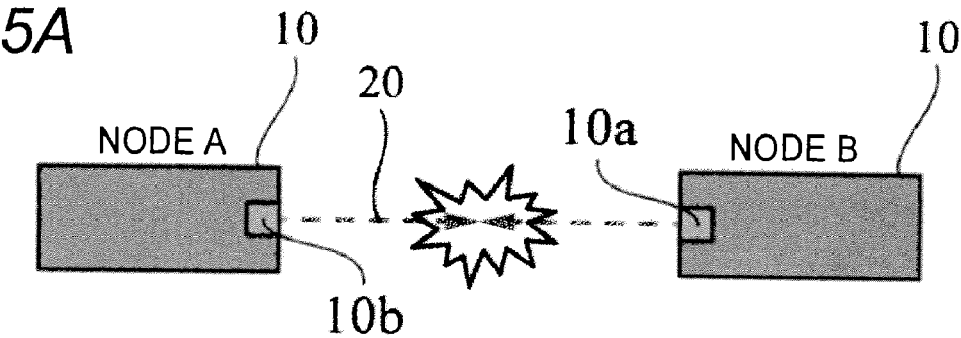
FIGS. 5A to 5E illustrate the power feeding pathway switching function of the device.
Figure 5B:
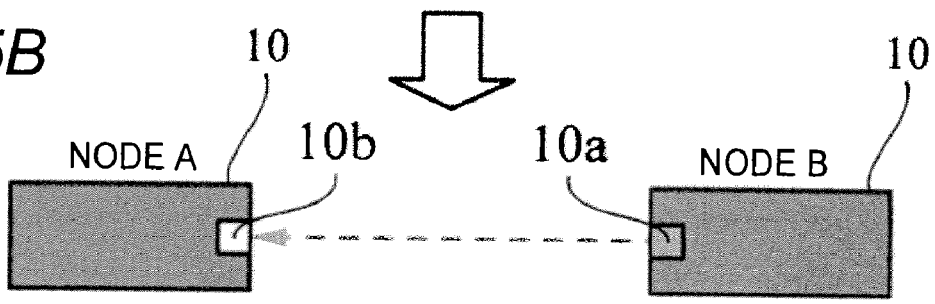

As illustrated in FIG. 5B, a transition to the power feeding disabling state is made while the power feeding control switch SW4 remains opened on the side of the second communication port 10b of the device at the node A. At this point, the second communication port 10b remains in the power receiving disabling state while the PoE detecting resistor valid-invalid changeover switch SW2 is opened. However, in the device 10 at the node A, the signal monitor circuit 14b monitors whether the detection signal from the node A is interrupted.

The detection signal is not outputted from the device at the node A, and the situation in which the detection signals are outputted from both the devices, whereby the device at the node B periodically outputs the detection signal. However, on the side of the node A, the PoE detecting resistor valid-invalid changeover switch SW2 is opened to turn off the PoE detecting resistor 11b, and the node A becomes the power receiving disabling state. Therefore, the power feeding is not performed from the device at the node B to the device at the node A. Accordingly, the power of each of the devices adjacent to each other is turned on while the power feeding is not performed between the devices.

Figure 5C:
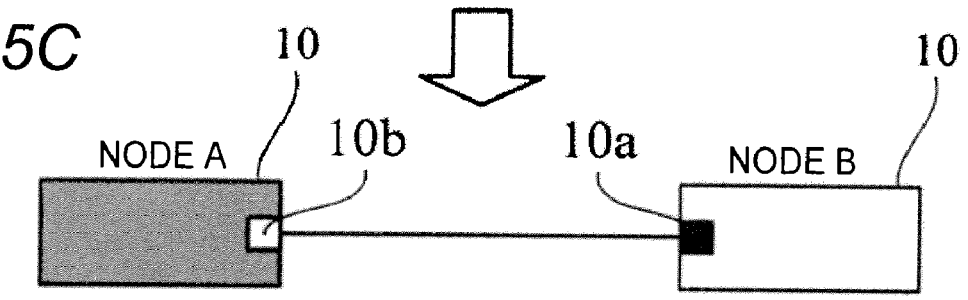

As illustrated in FIG. 5C, when the power of the device at the node B is turned off due to some sort of trouble, the PoE detecting resistor valid-invalid changeover switches SW1 and SW2 are closed to turn on the PoE detecting resistors 11a and 11b (enabling state), the communication port is switched to the power receiving enabling state. When the power of the device at the node B is turned off, the detection signal is not outputted. Therefore, the signal monitor circuit 14b of the device at the node A detects that the detection signal from the node B is interrupted, and the signal monitor circuit 14b notifies the controller 15 that the detection signal from the node B is interrupted.

Figure 5D:
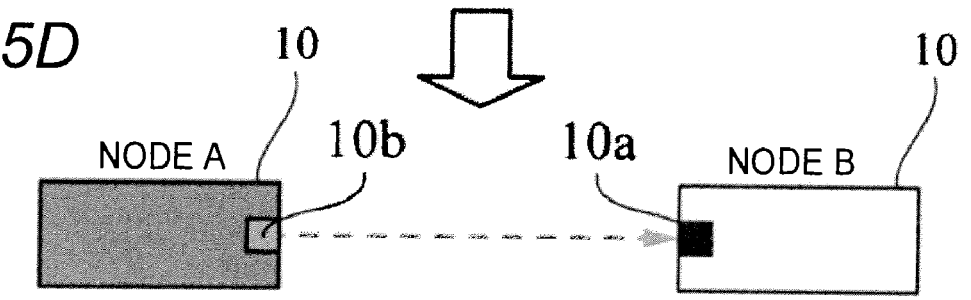
Figure 5E:
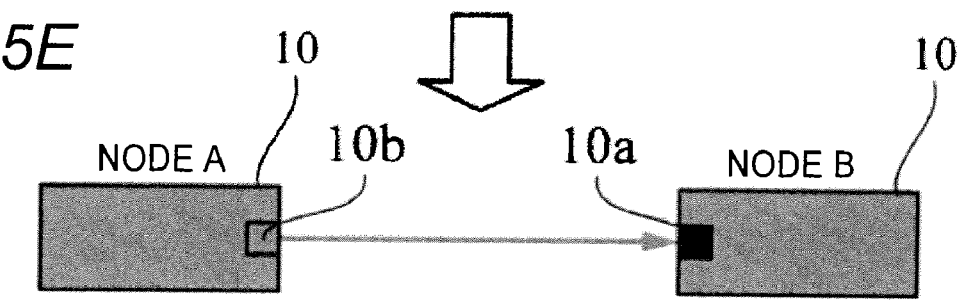

As illustrated in FIG. 5D, the controller 15 at the node A closes the PoE power receiving enabling-disabling check performing switch SW6 to resume the output of the detection signal to the device at the node B. As illustrated in FIG. 5E, when recognizing that the first communication port 10a of the device at the node B is in the power receiving enabling state, the device at the node A closes the power feeding control switch SW4 to start the power feeding, thereby turning on the power of the device at the node B.

Although not specifically illustrated, when the power of the device at the node A is turned off in the state of FIG. 5B, the side of the second communication port 10b of the device at the node A becomes the power receiving enabling state. Therefore, the device at the node B detects that the device at the node A becomes the power receiving enabling state by the periodically outputted detection signal, and the device at the node B starts the power feeding to the device at the node A.

FIG. 6 illustrates an automatic restoration processing function in case of trouble. The restoration can automatically be performed by the following procedure even if a trouble is generated. As illustrated in FIG. 6A, it is assumed that the power feeding from the device 10 at the power feeding node to the device 10 at the node A turns on the power of the device 10 at the node A, and it is assumed that part of the fed electric power is fed to the device 10 at the node B.

Figure 6A:
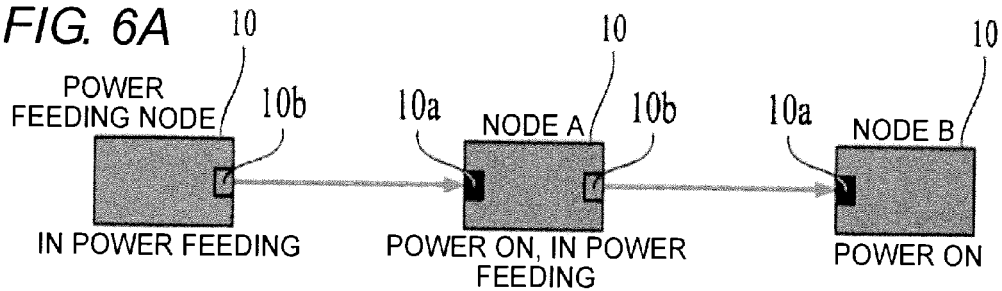
FIGS. 6A to 6E illustrate the power feeding pathway switching function of the device.
Figure 6B:
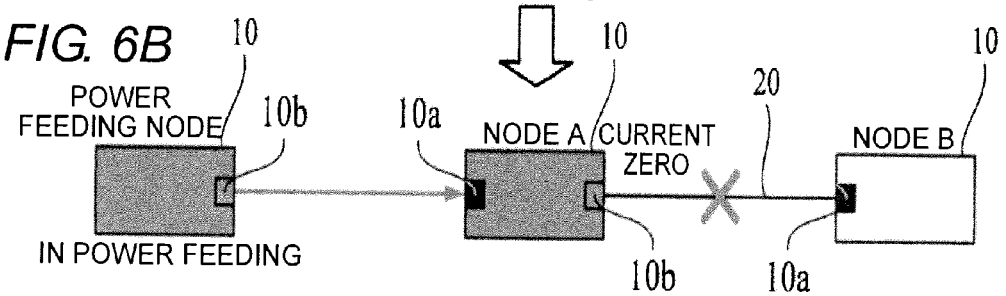

As illustrated in FIG. 6B, when the network cable 20 is disconnected between the node A and the node B, the power feeding cannot be performed from the device at the node A to the device at the node B. Therefore, on the side of the device at the node A, the supply current becomes zero to be able to detect abnormality. At this point, because the device at the node B does not perform the power receiving, the power of the device at the node B is turned off. However, the first communication port 10a becomes the power receiving enabling state (PoE detecting resistor is turned on).

Figure 6C:
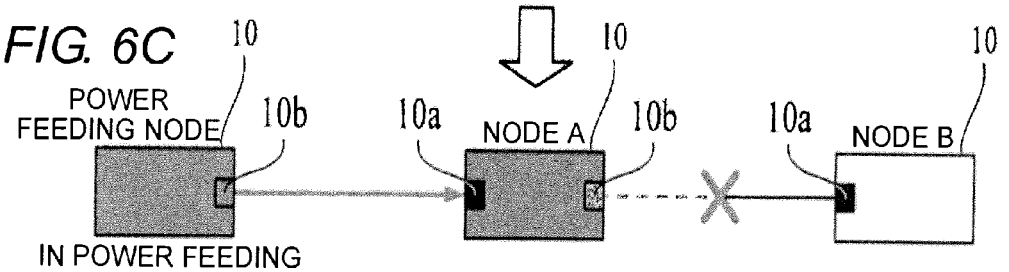

As illustrated in FIG. 6C, in the device at the node A, the second communication port 10b is put in the power feeding enabling state, and the second communication port 10b periodically outputs the detection signal detected by the PoE detection signal generator and detector 12b. When the network cable 20 remains in the disconnected state (trouble is not restored yet), because the PoE detecting resistor cannot be detected, the power feeding cannot be resumed, and the detection signal is continuously periodically outputted.

Figure 6D:
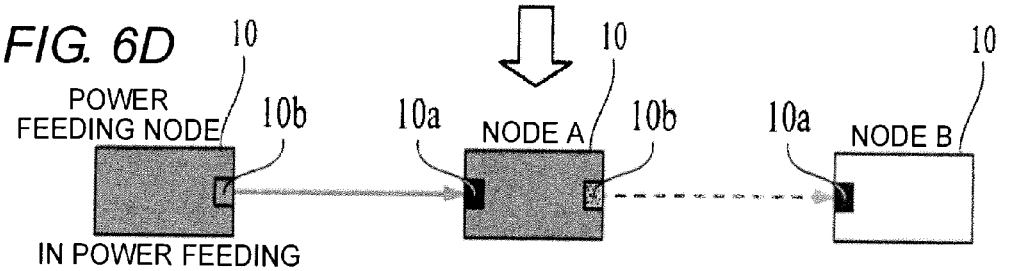
Figure 6E:
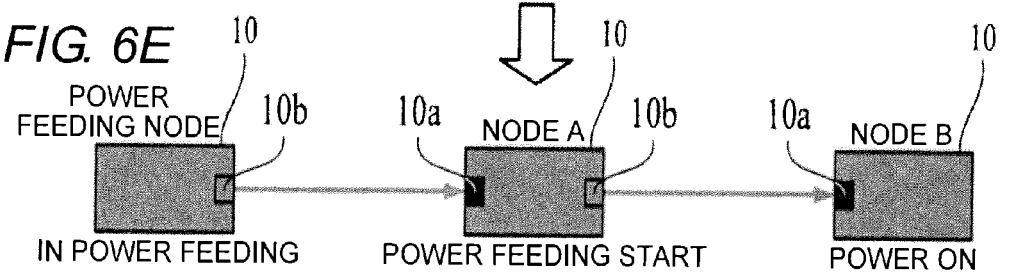

As illustrated in FIG. 6D, when the trouble is restored, the device at the node A detects that the PoE detecting resistor of the device at the node B is turned on based on the detection signal. Therefore, as illustrated in FIG. 6E, the power feeding from the device at the node A to the device at the node B is resumed like the start-up. The power feeding can automatically be resumed according to the restoration of the trouble.

FIG. 7 illustrates another mode of the automatic restoration processing function in case of trouble. The restoration can automatically be performed by the following procedure even if a trouble is generated. As illustrated in FIG. 7A, the device 10 at the node A can receive the electric power from both the adjacent devices 10. In the embodiment, it is assumed that the device 10 at the node A receives the electric power from the device 10 at the node C on the left of FIG. 7. Therefore, the first communication port 10a becomes the power receiving port, and the second communication port 10b becomes the power receiving disabling state. At this point, although the device 10 at the node D continuously outputs the detection signal, the second communication port 10b of the device at the node A is in the power receiving disabling state, and the PoE detecting resistor is turned off. Therefore, the power feeding is not actually performed. The nodes C and D may be the power feeding node that receives the supply of electric power from the external power feeding installation, or the nodes C and D may receive the power feeding from another device (not illustrated).

As illustrated in FIG. 7B, when the network cable 20 connecting the device at the node C and the device at the node A is disconnected, the power feeding is not performed from the device at the node C to the device at the node A. Therefore, on the side of the device at the node C, the supply current becomes zero to be able to detect the abnormality. At this point, because the device at the node A does not perform the power receiving, the power of the device at the node A is turned off, thereby putting the communication ports 10a and 10b of the device at the node A into the power receiving enabling state (PoE detecting resistor is turned on). Therefore, because the device at the node D continuously outputs the detection signal before the communication ports 10a and 10b of the device at the node A are put into the power receiving enabling state, the device at the node D recognizes that the second communication port 10b of the device at the node A can receive the electric power.

As illustrated in FIG. 7C, the device at the node A receives the supply of the electric power from the device at the node D, and the power of the device at the node A is turned on. Therefore, the device at the node A switches the first communication port 10a to the power receiving disabling state. The signal monitor circuit 14a connected to the communication port that becomes the power receiving port monitors whether the supply of electric power is continuously performed to the own device. When the signal monitor circuit 14a detects that the supply of electric power is stopped, the controller that receives the detection signal of the signal monitor circuit 14a performs the control so as to automatically switch all the communication ports to the power receiving enabling state. Accordingly, for the ring network configuration, when the power feeding pathway is cut out due to the disconnection of the network cable 20, all the communication ports are put into the power receiving enabling state, so that the power receiving can be performed from another communication port.

As illustrated in FIG. 7D, the device at the node A that received the power feeding from the second communication port 10b outputs the detection signal in order to perform the power feeding from the first communication port 10a to the adjacent device. Because the network cable 20 that connects both the devices remains disconnected, the device at the node A cannot detect the detecting resistor of the device at the node C, and the power feeding is not performed.

As illustrated in, FIG. 7E, when the trouble with the network cable 20 is restored, because both the device at the node C and the device at the node A output the detection signals, the state similar to that of FIG. 5A is generated to stop the supply of the detection signal from one of the node sides.

When the detection signal at the node C is stopped, as illustrated in FIG. 7F, the second communication port 10b of the device at the node C is switched from the power feeding enabling state to the power feeding disabling state. The second communication port 10b of the device at the node C is also in the power receiving disabling state. The detection signal is periodically outputted from the device at the node A to the device at the node C.

In the embodiment, the invention is applied to the ring network configuration by way of example. However, the invention can be applied to various network configurations. In FIG. 1, one device at the power feeding node is connected to the power feeding installation that is of the external power supply. Alternatively, plural devices may be connected to the power feeding installation. In such cases, the power receiving and the power feeding of the communication port are appropriately switched depending on the situation. Therefore, the device that is not the power feeding node can receives the supply of electric power through the network, and the supply of electric power can be received in generating the trouble while the power feeding pathways are automatically switched.

In the embodiment, the data and the electric power are transmitted and received through the same network cable by utilizing PoE. However, the invention is not limited to the embodiment. For example, the data and the electric power may be transmitted and received through another cable.

What is claimed is:

1. A device that is connected to a network, the device comprising:
   a plurality of power ports; and
   a control unit that puts the plurality of power ports into a power receiving enabling state in an initial state before power receiving, the control unit switching the power ports that receive no supply of electric power to a power receiving disabling state when receiving the supply of the electric power from one of the plurality of power ports.

2. The device according to claim 1, further comprising:
   an electric power supply unit that uses part of the supplied electric power as the electric power supplied to another device connected to the network; and
   a unit that outputs the electric power, outputted from the electric power supply unit, from one of the power ports that are switched to the power receiving disabling state toward another device.

3. The device according to claim 2, further comprising:
a unit that detects electric power necessary for another device; and
a unit that determines whether power feeding can be performed to another device based on an electric power necessary for the own device and the supplied electric power, the unit directly outputting the electric power outputted from the electric power supply unit toward another device when the power feeding can be performed to another device, the unit making a request for an increase in power feeding amount to an installation/device that receives supply of the electric power to the device when power feeding cannot be performed to another device.

4. The device according to claim 2, further comprising a unit that outputs electric power from the electric power supply unit to another device when the device transfers from a state in which the power feeding cannot be performed to another device to a state in which the power feeding can be performed to another device.

5. A network system in which a plurality of devices are connected into a ring shape,
wherein at least one of the plurality of devices includes a unit that receives supply of electric power from an external power supply while supplying part of the supplied electric power to another device connected to the network, and
another device is the device according to claim 2.

6. The device as in claim 1, further comprising a unit that switches all the plurality of power port to the power receiving enabling state when the power feeding is eliminated.

7. A network system in which a plurality of devices are connected through a network,
wherein at least one of the plurality of devices includes a unit that receives supply of electric power from an external power supply while supplying part of the supplied electric power to another device connected to the network, and
another device is the device as in claim 1.

8. The device as in claim 1, wherein the power port is a communication port that conducts data communication, and the network can transmit the data and the electric power.

* * * * *